(12) United States Patent
Abreu et al.

(10) Patent No.: US 9,151,353 B2
(45) Date of Patent: Oct. 6, 2015

(54) TRACTION CONTROL VALVE FOR HYDRAULIC SHOCK ABSORBER

(75) Inventors: Guilherme Caravieri de Abreu, São Paulo (BR); Sergio Nelo Vannucci, São José dos Campos (BR); Myriam Gaieta Vannucci, legal representative, São José dos Campos (BR)

(73) Assignee: Magneti Marelli Cofap Companhia Fabricador de Pecas, Santo Andre (BR)

(*) Notice: Subject to any disclaimer, the term of this patent is extended or adjusted under 35 U.S.C. 154(b) by 153 days.

(21) Appl. No.: 13/637,749

(22) PCT Filed: Mar. 30, 2011

(86) PCT No.: PCT/BR2011/000091
§ 371 (c)(1),
(2), (4) Date: Jan. 16, 2013

(87) PCT Pub. No.: WO2011/120119
PCT Pub. Date: Oct. 6, 2011

(65) Prior Publication Data
US 2013/0248307 A1    Sep. 26, 2013

(30) Foreign Application Priority Data
Apr. 1, 2010    (BR) .................................... 1001136

(51) Int. Cl.
| F16F 9/504 | (2006.01) |
| F16F 9/34 | (2006.01) |
| F16F 9/348 | (2006.01) |
| F16F 9/512 | (2006.01) |

(52) U.S. Cl.
CPC . *F16F 9/34* (2013.01); *F16F 9/348* (2013.01); *F16F 9/504* (2013.01); *F16F 9/5126* (2013.01)

(58) Field of Classification Search
CPC .......... F16F 9/50; F16F 9/504; F16F 2222/08
USPC ............ 188/278, 313, 316, 317, 322.15, 275, 188/281, 282.1, 282.5, 282.6, 282.8
See application file for complete search history.

(56) References Cited

U.S. PATENT DOCUMENTS

| 1,268,452 | A | * | 6/1918 | Goodyear ...................... 188/275 |
| 2012/0305352 | A1 | * | 12/2012 | Yu et al. ......................... 188/275 |
| 2013/0056317 | A1 | * | 3/2013 | Kim .............................. 188/275 |
| 2014/0048366 | A1 | * | 2/2014 | Lee et al. ................. 188/322.15 |

FOREIGN PATENT DOCUMENTS

| CA | 2128926 | A1 | | 1/1995 |
| DE | 1505608 | A1 | * | 7/1970 |

(Continued)

*Primary Examiner* — Thomas J Williams
(74) *Attorney, Agent, or Firm* — Volpe and Koenig, P.C.

(57) ABSTRACT

The present shock absorber has a pressure tube with a compression chamber and a traction chamber, separated by a piston provided with a traction passage. The valve includes: a counter pressure chamber loaded by piston, provided with an upper opening and a control base, open to the compression chamber, where a hollow sealing plug is displaceable between a closed position, hence communicating traction passage only with the counter pressure chamber, and open positions; a return spring driving sealing plug to its closed position; and an inertial seal, inside the counter pressure chamber and displaceable from inoperative position, away from the control base, to operative position, where it blocks said base, increasing hydraulic pressure in the counter pressure chamber to hydraulically drive sealing plug to its closed position when piston is subjected to a given upward acceleration.

9 Claims, 3 Drawing Sheets

(56) References Cited

FOREIGN PATENT DOCUMENTS

| | | | | |
|---|---|---|---|---|
| DE | 4302623 A1 | 8/1994 | | |
| FR | 1331741 A | * | 7/1963 | |
| FR | 2404772 A1 | * | 4/1979 | |
| GB | 2090948 A | | 7/1982 | |
| GB | 2111168 A | | 6/1983 | |

* cited by examiner

TRACTION CONTROL VALVE FOR HYDRAULIC SHOCK ABSORBER

FIELD OF THE INVENTION

The invention refers to a valve to be applied to a hydraulic shock absorber for the suspension of road vehicles for cargo or passenger transportation, to allow appropriate control of hydraulic fluid flow inside it during extension movements of the shock absorber, not only under usual operative conditions caused by low amplitude and high frequency movements, but also in vertical upward oscillation of the body of the vehicle in high amplitude and low frequency movements, such as for example when the vehicle travels on highly uneven road surfaces.

STATE OF THE ART

Double-effect telescopic hydraulic shock absorbers are well known in the state of the art. They are usually employed in suspension systems of road vehicles for transportation of people or cargo, with pre-defined damping factors during manufacture, to reduce the usual vertical oscillations of low amplitude and high frequency of the body of the vehicle caused by irregularities on the road surface where the vehicle travels.

However, this feature no longer meets the new operational requirements of automotive vehicles on the market. The use of pre-determined damping factors in the manufacture of shock absorbers does not allow appropriate control of upward oscillations of the body of the vehicle in wide ranges of amplitude and frequency of the oscillatory movement and, consequently comfortable and safe trips for passengers and cargo in different road surface conditions.

A disadvantage of the know telescopic hydraulic shock absorbers, with pre-determined damping factors, is their low sensitivity to wide amplitude and low frequency oscillatory movements of the body, which occur when the vehicle travels on rough road surfaces.

This displacement condition of the vehicle causes an upward movement of the body, which is not appropriately damped by the shock absorbers of the state of the art, since pre-established damping factors do not consider the damping of wide amplitude and low frequency oscillations.

The telescopic hydraulic shock absorbers of the state of the art, with one or two tubes as shown in FIGS. 1 and 2, comprise a pressure tube 10 inside of which a sliding piston 20 is assembled and which divides the pressure tube 10 into a compression chamber CC, in the lower portion of the tube and a traction chamber TC, in its upper portion, said chambers containing a hydraulic fluid, i.e., an incompressible viscous fluid, being said chambers interconnected in both directions by axial passages and control valves (not shown) in piston 10.

As disclosed in further details in the description of the invention, piston 20 generally comprises a passage with low resistance to the flow of the hydraulic fluid (viscous fluid) contained in the pressure tube 10 for the telescopic compression movement, and a control valve for the passage of hydraulic fluid for the telescopic traction movement, i.e., extension of the shock absorber.

In these well-known hydraulic shock absorbers with one or two tubes, the upper end of the pressure tube 10 is closed by a sealing ring plate 11, usually associated to a sealing ring 12, through which a rod 30 is axially displaced, and whose end inside the pressure tube 10 is attached to piston 20.

In the shock absorber with two tubes, shown in FIG. 1, the lower end of pressure tube 10 is closed by a valve plate 13, provided with a pair of passages (not shown), one of which houses a compression valve, while the other passage houses a traction valve, said valves are not shown since they are not part of the invention.

Said compression and traction valves, provided in shock absorbers with two tubes, allow the compression chamber CC to be in communication with the fluid controlled by a reservoir R of hydraulic fluid during compression and extension displacements of the shock absorber, respectively. The hydraulic fluid reservoir R is usually formed by a reservoir tube 40 which is coaxially positioned around pressure tube 10 and partially filled with the hydraulic fluid (incompressible viscous fluid), complemented by a compressible gas that compensates, by its compression, the volume occupied by rod 30 inside the traction chamber TC during the reciprocating movement of piston 20. The reservoir tube 40 has sealed ends, consolidating the structure of the shock absorber with two tubes, and it may also be provided with a protection tube 45, coaxially located around reservoir tube 40, to protect rod 30 of piston 20 against impact from rocks and other objects thrown against the suspension of the vehicle.

In shock absorbers with one tube of the type shown in FIG. 2, the reservoir R is substituted by a gas chamber CG, defined inside pressure tube 10 and separated from compression chamber CC by a floating piston 35. Gas chamber CG contains a compressible fluid and works by varying its volume by the displacement of floating piston 35 to compensate the volume variation caused by the reciprocating movement of rod 30 inside traction chamber TC.

In these known hydraulic shock absorbers with one or two tubes, the damping rate or factor is defined by the size of the control valves, particularly the traction control valve in piston 20 to regulate the flow of hydraulic fluid (viscous fluid) from the traction chamber TC to the compression chamber CC for the extension of the shock absorber, i.e., when the vehicle body is displaced upwards with a given acceleration. Said traction control valve is designed to provide a pre-determined restriction rate to the passage of hydraulic fluid flow when the fluid is driven by upward oscillations, of low amplitude and high frequency of piston 20, which occur during the usual displacement of the vehicle on road surfaces usually found in the areas where the vehicles operate.

Due to said most relevant size characteristics for adequate operation of the shock absorber when submitted to low frequency and high amplitude oscillation by the passage of the vehicle over a rough surface, the traction flow control valve is unable to restrict hydraulic fluid flow as desired to prevent the vehicle body to raise in acceleration condition that may upset passenger comfort or cargo safety in the moving vehicle.

Thus, the damping rate or factor provided by said shock absorbers cannot produce, in a wide range of amplitudes and frequencies, appropriate damping to upward and accelerated vertical oscillations of the body of the vehicle. Low frequency and high amplitude accelerated oscillations are not avoided or minimized by the known shock absorbers with one or two tubes. Said operational limitation allows the body to oscillate upwards, under undesired acceleration conditions in terms of comfort and safety, when the vehicle travels on rough terrain.

Despite the fact that shock absorbers provided with electromagnetic valves actuated by electronic circuits to control hydraulic fluid flow during the operation of the shock absorber under conditions of movement on rough surfaces are also known in the state of the art, said shock absorbers inconveniently require complex construction and high costs.

SUMMARY OF THE INVENTION

Due to the deficiencies of the known telescopic hydraulic shock absorbers with double effect and one or two tubes for vehicles, the object of the present invention is to provide a traction control valve, of simple construction and easy adaptation to the shock absorber piston, to hydraulically brake upward movements of the body of the vehicle in different operational conditions, associated with wide amplitude and frequency range oscillations.

More specifically, the traction control valve at issue allows additional and automatic control of hydraulic fluid flow inside the shock absorber according to the inertial forces the control valve is submitted to when upward displacement of the body occurs after given acceleration.

An additional object of the present invention is to provide an inertial traction control valve as mentioned above that can be easily adapted to the shock absorber piston to substitute the usual traction control valve produced with a pre-determined damping factor or rate for each shock absorber application.

The present traction control valve is applied to a hydraulic shock absorber of the type that comprises a pressure tube internally divided into a compression chamber and a traction chamber by an axially hollow piston with a traction passage.

According to the present invention, the traction control valve at issue comprises a counter pressure chamber loaded by the piston and provided with an upper opening, a lower control base and a relief orifice, open to the compression chamber; an axially hollow and displaceable sealing plug, inside the counter pressure chamber, between a closed position, blocking communication, through the upper opening, between the traction passage and the compression chamber and keeping the first in communication with the counter pressure chamber, through the sealing plug, and open positions, communicating the traction passage to the compression chamber; a return spring fastened to the piston and forcing the sealing plug to its closed position; an inertial seal to be displaced downwards, inside the counter pressure chamber, from an inoperative position, away from the control base, to an operative position, blocking the control base and increasing hydraulic pressure in the counter pressure chamber to hydraulically drive the sealing plug to its closed position, in the same direction of activation of the return spring, when the piston is submitted to a given upward acceleration; and a control spring in the counter pressure chamber that drives the inertial seal to its inoperative position.

The construction of the inertial traction control valve described above makes it easy to incorporate it to the structure of the hydraulic telescopic shock absorber and allows the shock absorber to hydraulic brake, not only the usual reduced amplitude and high frequency extension displacements, but also the high amplitude and low frequency extension movements, when the hydraulic pressure inside the counter pressure chamber is high due to the inertial displacement of the control seal, acting jointly with the closing spring, to restrict passage of hydraulic fluid from the traction chamber to the compression chamber, when the traction control piston-valve set is displaced upwards with a given acceleration.

The solution proposed by the present invention automatically boosts the action of the closing spring with the help of the hydraulic force, increasing the damping factor of the shock absorber when the vehicle body is submitted to a given rate of upward acceleration in relation to the vehicle wheels.

BRIEF DESCRIPTION OF DRAWINGS

The invention is disclosed below, based on the attached drawings, given as mere examples of possible embodiments of the invention, wherein.

DESCRIPTION OF THE ILLUSTRATED EMBODIMENT

Figure 1:
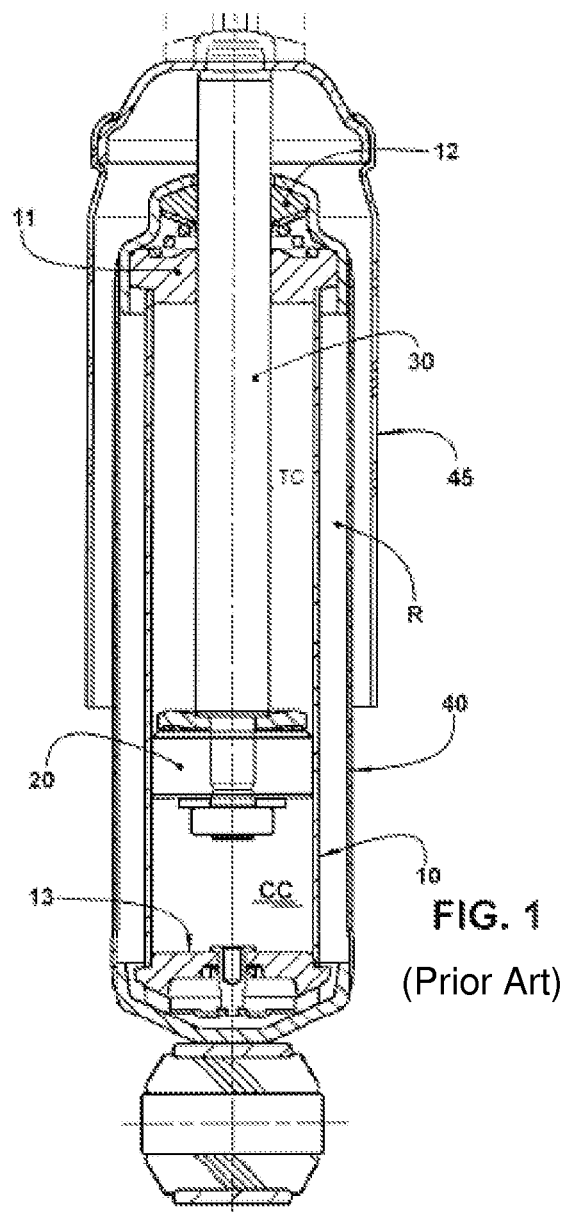
FIG. 1 shows a schematic lengthwise cross section of a hydraulic shock absorber with two tubes, built according to the state of the art.
Figure 2:
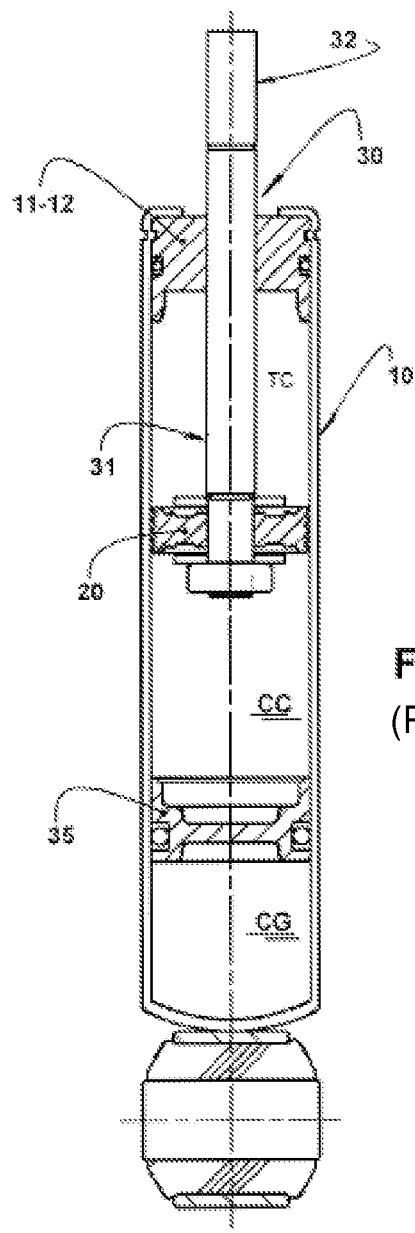
FIG. 2 shows a schematic lengthwise cross section of a hydraulic shock absorber with one tube, built according to the state of the art.

As already mentioned, the invention is applied to telescopic hydraulic shock absorbers with double effect, with one or two tubes as previously described, making reference to FIGS. 1 and 2 of the attached drawings.

Figure 3:
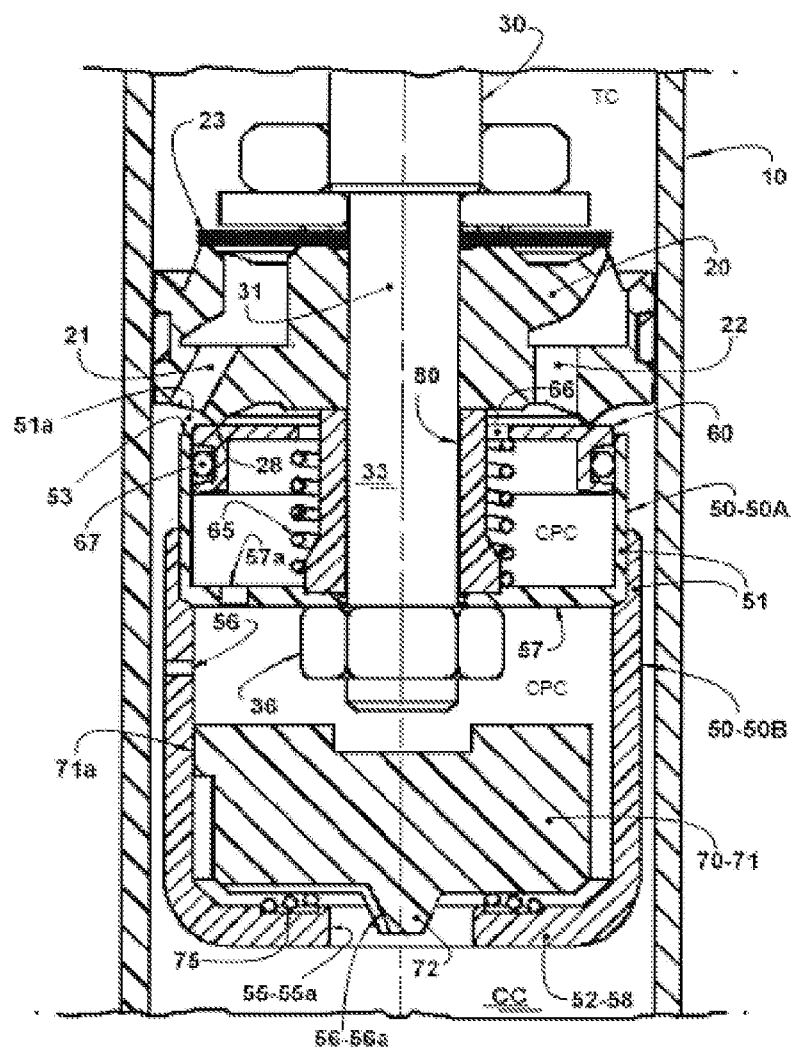
FIG. 3 shows a partial and somewhat enlarged lengthwise cross section of the pressure tube of a shock absorber, with one or two tubes, as shown in FIGS. 1 and 2, whose piston is provided with the inertial traction flow control valve, object of the invention.

According to the invention, the traction control valve may be applied to a hydraulic shock absorber with one or two tubes and, as shown in FIG. 3, may be associated to a piston 20 that is axially hollow with a compression passage 21 and a traction passage 22.

The compression passage 21 is operatively associated with a retention valve 23, of known construction and which operates to allow hydraulic fluid flow with reduced resistance, from the compression chamber CC to the traction chamber TC during the telescopic compression movement of the shock absorber and to stop reverse hydraulic fluid flow during telescopic extension or traction movement of the shock absorber.

Traction passage 22 is designed to operate jointly with the control valve at issue, restricting hydraulic fluid flow from the traction chamber TC to the compression chamber CC during extension movement of the shock absorber.

According to the invention, the traction control valve comprises: a counter pressure chamber CPC loaded by piston 20, preferably, defined by a tubular body 50 having a cylindrical side wall 51, defining an upper opening 51a and a radial clearance with pressure tube 10, inside the compression chamber CC and also a bottom wall 52, through which a control base 55 is formed.

At least one of the parts defined by cylindrical side wall 51 and bottom wall 52 is provided with a relief orifice 56, to keep fluid communication between the counter pressure chamber CPC and the compression chamber CC restricted and constant, independently of the operational position of the control valve.

Inside the counter pressure chamber CPC, a sealing plug 60 is assembled, axially hollow and displaceable between a closed position, blocking communication, through upper opening 51a, between traction passage 22 and the compression chamber CC, and keeping traction passage 22 in communication with the counter pressure chamber CPC, through the sealing plug 60, and open positions, allowing communication between traction passage 22 and the compression chamber CC, and also inside the counter pressure chamber CPC, through axially hollow sealing plug 60

A return spring 65 is attached to piston 20 to drive sealing plug 60 to its closed position, which blocks fluid communication between the traction TC and compression CC chambers, through traction passage 22, when piston 20 is submitted to upward displacements with a certain rate of acceleration corresponding to the usual telescopic oscillations of the shock absorber, with reduced amplitude and high frequency, usually considered in the design of the shock absorber and particularly, of return spring 65.

The control valve at issue also comprises an inertial seal 70 to be displaced downwards, inside the counter pressure chamber CPC, from an inoperative position, away from control base 55, to an operative position in which it blocks control base 55, increasing hydraulic pressure in the counter pressure chamber CPC, so that the sealing plug 60 is hydraulically driven to its closed position, in the same direction of actuation of return spring 65 when piston 20 is submitted to a given upward acceleration, which generally occurs when the shock absorber is submitted to telescopic oscillations of high amplitude and reduced frequency, giving the shock absorber a higher damping rate of extension than the one obtained solely by the action of return spring 65.

The control valve also comprises a control spring 75 in the counter pressure chamber CPC that drives inertial seal 70 to its inoperative position, wherein the counter pressure chamber CPC is kept in fluid communication with the compression chamber CC, i.e., at an insufficient hydraulic pressure to act against sealing plug 60.

In the embodiment shown in FIG. 3, inertial seal 70 is defined by a cylindrical block 71, assembled with clearance inside the counter pressure chamber CPC and incorporating radial projecting portions 71a, sliding and placed against cylindrical side wall 51 of tubular body 50, said cylindrical body 71 having an inertial mass capable of moving downwards, against the action of control spring 75 to block the control base 55 when piston 20 is submitted to said upward acceleration.

According to the configuration shown, control base 55 may be defined by a through hole 55a at bottom wall 52 of tubular body 50. In this case, cylindrical block 71 is provided with an inverted trunk cone shaped lower projection 72, which is designed and positioned to fit in passing hole 55a of control base 55, blocking the latter, when inertial seal 70 is displaced to its operative position, not shown in FIG. 3.

In the embodiment of the inertial sealing mentioned above, the relief orifice 56 may be defined by a groove 56a, provided along the lower projection 72 of inertial seal 70, and also of the lower region of the latter, to restrict fluid communication between the counter pressure CPC and compression CC chambers, even with the lower projection 72 of inertial seal 70 inside through hole 55a. This way, blockage to the traction movement of the shock absorber is prevented.

Multiple relief orifices 56 may be provided, not only in control base 55 itself, but also in other portions of tubular body 50.

The shock absorber comprises a rod 30 with an inner end 31 attached to piston 20, and an outer end 32, to be fastened to a vehicle body not shown.

In the preferred and disclosed embodiment, inner end 31 of rod 30 incorporates an axial extension 33 that projects beyond piston 20 into counter pressure chamber CPC, through sealing plug 60, being tubular body 50 of counter pressure chamber CPC and return spring 65 assembled at said axial extension 33 of rod 30. In this embodiment, tubular body 50 of counter pressure chamber CPC comprises: an upper cup portion 50A housing sealing plug 60 and return spring 65, having a lower wall 57 fastened by a nut 36 to axial extension 33 of rod 30 and provided with at least one passing opening 57a; and a lower cup portion 50B, upper and hermetically fastened to upper cup portion 50A, housing inertial seal 70 and having its lower wall 58 defined by bottom wall 52 of tubular body 50.

Still, according to the embodiment shown, lower wall 57 of upper cup portion 50A is axially pressured against tubular spacer 80, preferably made of metal, located around axial extension 33 of rod 30 and laid against piston 20, said return spring 65 being assembled around tubular spacer 80, between lower wall 57 and sealing plug 60, which is axially hollow by a central opening 66 through which tubular spacer 80 and axial extension 33 of rod 30 are located with a clearance, allowing counter pressure chamber CPC to be pressurized by hydraulic fluid flowing through traction passage 22, when sealing plug 60 is in its closed position.

As shown in FIG. 3, sealing plug 60 may have the form of an inverted cylindrical cup, with its hanging lateral wall carrying at least one elastic sealing ring 67 cooperating with side wall 51 of tubular body 50.

In the illustrated embodiment, tubular body 50 of counter pressure chamber CPC presents an upper edge 53 axially away from piston 20 and defining, with the latter, upper opening 51a of counter pressure chamber CPC, which, in the illustrated embodiment example, is defined between upper edge 53 of tubular body 50 and a ring base 28, incorporated to piston 20, open for the passage of traction 22 and against which sealing plug 60 is laid in its closed position, blocking direct fluid communication between traction passage 22 and compression chamber CC.

Although only one embodiment of the invention has been described, one should understand that changes of shape and embodiment of the different component parts of the control valve may be made, without escaping from the constructive concept defined by the claims that accompany the present descriptive report.

The invention claimed is:

1. Traction control valve for a telescopic hydraulic shock absorber comprising a pressure tube (10) internally divided into a compression chamber (CC) and a traction chamber (TC), a piston (20) axially hollow with a traction passage (22), and a compression passage (21);
   a rod (30) with an internal end (31) supporting the piston (20), and an external end (32) fastened to a vehicle body, wherein the valve comprises a counter pressure chamber (CPC) supported by the rod (30), placed below and adjacent to the piston (20), and externally defined by a tubular body (50), comprising:
   an upper cup portion (50A) housing a sealing plug (60) and a return spring (65), and having a lower wall (57) fastened to an axial extension (33) of the rod (30) and provided with at least one through hole (57a); and
   a lower cup portion (50B) hermetically fastened to the upper cup portion (50A), housing an inertial seal (70) and having its lower wall (58) defined by a bottom wall (52) of the tubular body (50),
   wherein the sealing plug (60) provides a displaceable top closure of the upper cup portion (50A) of the counter pressure chamber.

2. The valve, according to claim 1, wherein the counter pressure chamber (CPC) comprises:
   a cylindrical side wall (51), for internally guiding the sealing plug (60) and defining the upper opening (51a), the cylindrical side wall (51) of the tubular body (50) having a radial clearance with pressure tube (10) inside the compression chamber (CC); and
   wherein the sealing plug has an inverted cylindrical cup shape with a hanging lateral wall carrying an elastic sealing ring (67).

3. The valve, according to claim 2, wherein the inertial seal (70) is defined by a cylindrical block (71) assembled with clearance inside the counter pressure chamber (CPC) and incorporating a projecting radial portions (71a), sliding and laid against the cylindrical side wall (51) of the tubular body (50), the cylindrical block (71) having an inertial mass capable of moving downwards to block a control base (55)

against the action of the control spring (75) when the piston (20) is submitted to an upward acceleration.

4. The valve, according to claim 3, wherein the control base (55) comprises a through hole (55a) provided at the bottom wall (52) of the tubular body (50), the cylindrical block (71) is provided with a lower projection (72), having an inverted trunk conic shape, configured and positioned to be fitted within the through hole (55a) of the control base (55), for blocking the latter when the inertial seal (70) is displaced to its operative position.

5. The valve, according to claim 4, wherein a relief hole (56) is provided in at least one of the portions defined by the cylindrical side wall (51), by the bottom wall (52), and by the inertial seal (70), keeping fluid communication between the counter pressure chamber (CPC) and the compression chamber (CC) restricted and constant, independently of the operative position of the sealing plug (60) and the inertial seal (70), the relief hole (56) comprises a groove (56a) provided along the lower projection (72) of the inertial seal (70), for keeping fluid communication between the counter pressure (CPC) and the compression (CC) chambers, even when the lower projection (72) of the inertial seal (70) is placed inside the through hole (55a).

6. The valve, according to claim 1, wherein the lower wall (57) of the upper cup portion (50A) is axially driven against a tubular spacer (80) located around the axial extension (33) of the rod (30) and laid against the piston (20), said return spring (65) being assembled around the tubular spacer (80), between the lower wall (57) and sealing plug (60).

7. The valve, according to claim 6, wherein the tubular body (50) of the counter pressure chamber (CPC) has an upper edge (53) axially away from the piston (20) and defining an upper opening (51a) of the counter pressure chamber (CPC) with the piston (20).

8. The valve, according to claim 7, wherein the upper opening (51a) of the counter pressure chamber (CPC) is defined between the upper edge (53) of the tubular body (50) and a ring base (28), incorporated to the piston (20), open to traction passage (22) and against which the sealing plug (60) is assembled in its closed position, blocking direct fluid communication between the traction passage (22) and the compression chamber (CC).

9. The valve, according to claim 8, wherein the sealing plug (60) is axially hollow with a central opening (66), through which the tubular spacer (80) and the axial extension (33) of the rod (30) are assembled with a clearance.

* * * * *